United States Patent [19]
Johnsen

[11] Patent Number: 5,236,170
[45] Date of Patent: Aug. 17, 1993

[54] SHOCK ABSORBING BICYCLE SEAT MOUNTING POST ASSEMBLY

[75] Inventor: Thore Johnsen, Wantagh, N.Y.

[73] Assignee: T.J.S.W. Inc., East Meadow, N.Y.

[21] Appl. No.: 743,866

[22] Filed: Aug. 12, 1991

[51] Int. Cl.$^5$ .............................................. B62J 1/00
[52] U.S. Cl. .................................. 248/578; 248/219.2; 248/601; 297/209; 403/369; 403/371
[58] Field of Search ............... 248/599, 600, 601, 561, 248/578, 631, 219.2; 411/304, 302; 297/209; 403/365, 369, 371

[56] References Cited

U.S. PATENT DOCUMENTS

| | | | |
|---|---|---|---|
| 598,186 | 2/1898 | Thompson | 248/631 X |
| 618,639 | 1/1899 | Bullard | 403/371 X |
| 2,284,352 | 5/1942 | Zank | 248/600 X |
| 2,664,941 | 1/1954 | Gillespie | 248/600 X |
| 2,701,839 | 2/1955 | Sherbinin | 248/219.2 X |
| 3,198,474 | 8/1965 | Doll | 248/631 X |
| 4,997,232 | 5/1991 | Johnson | 248/601 X |
| 5,094,424 | 3/1992 | Hartway | 248/600 |

FOREIGN PATENT DOCUMENTS

| | | | |
|---|---|---|---|
| 600465 | 2/1926 | France | 248/601 |
| 1373624 | 11/1963 | France | 403/369 |
| 2436588 | 5/1980 | France | 248/601 |

Primary Examiner—David L. Talbott
Attorney, Agent, or Firm—Ladas & Parry

[57] ABSTRACT

A shock absorbing bicycle seat mounting post assembly is mounted in a hollow tubular socket member, by means of a binder clamp, in the frame of a bicycle. The shock absorber includes a compression spring which will effectively absorb shocks which are carried through the frame when the wheels encounter obstacles and holes when traveling along the ground. The bicycle seat mounting post assembly includes a number of shims which will adapt the post assembly to varying sizes of bicycle frames. A bellows is provided to keep dirt and dust out of the spring area and protect skin and fingers from being pinched. Stabilization is enhanced by the provision of a piston at the lower end of the movable shaft upon which the seat is attached. A variable volume reducing device may be positioned below the seat mounting post to adjust the volume of air trapped below the piston.

14 Claims, 3 Drawing Sheets

SHOCK ABSORBING BICYCLE SEAT MOUNTING POST ASSEMBLY

BACKGROUND OF THE INVENTION

1. Field of the Invention

This invention relates generally to bicycle seats and more specifically to a shock absorbing bicycle seat mounting post assembly.

2. Brief Description of the Prior Art

Numerous bicycle seats have been provided in the prior art that are adapted to include spring biased support structures carried on bicycles. For example, U.S. Pat. Nos. 3,466,086 to James et al; 4,182,508 to Kallai et al. 4,456,295 to Francu; 2,107,561 to Brandt et al.; 640,483 to McKenzie; 564,142 to Beardsley; 2,162,399 to Hayes; 4,736,983 to Furbee; and 4,997,232 to Johnsen (inventor of the present invention); as well as French Patent No. 870,860 and British Patent No. 560,679 are all illustrative of such prior art. While these units may be suitable for the particular purpose to which they address, they would not be as suitable for the purposes of the present invention as hereinafter described.

Brandt et al. '561 and Johnsen '232 are examples of spring supported seat structures which are exposed to dust and dirt accumulation and could be dangerous if the skin or the fingers of a person is pinched by the collapsing spring, and this would be especially important when small children are riding as a second passenger on the bicycle.

Moreover, none of the prior art arrangements appear to adequately account for the varying sizes of bicycle seat posts relative to that of the bicycle frame tube within which they mount. The Brandt et al. '561 patent shows a typical arrangement wherein the top portion of the frame tube is slit vertically, and a generally U-shape clamp has its legs clamped toward one another by means of nut-and-bolt combination. However, this type of clamping is inadequate when the diameter of the seat post is much smaller than the internal diameter of the frame tube. Furthermore, if the U-shape clamp is forced to attain its minimum diameter under such a condition, the top portion of the frame tube is deformed, permanently weakening the frame tube and making it difficult to insert a seat post of a larger diameter at a later date.

Finally, although Brandt et al., the British patent '679, Hayes '399, and others use a spring loaded seat post members sliding within a bicycle frame tube, there are no provisions for stabilizing the extreme ends of the moving parts of the seat posts, and further there are no means provided for cushioning the impactive forces imparted to the seat posts except for the reactive forces of the compression springs. It would be advantageous if bicycle seat posts which use compression springs would also have a supplementary impact absorbing feature. None of the known prior art provides this combination.

SUMMARY OF THE INVENTION

The present invention provides a shock absorbing bicycle seat mounting post assembly that will overcome the shortcomings of the prior art devices.

The invention provides a shock absorbing bicycle seat mounting post that can be installed on the frame of a bicycle so that it will effectively absorb shocks which are carried through the frame when the wheels encounter obstacles and holes when traveling along the ground. In this connection, the present invention is an improvement over the inventor's prior invention shown, described, and claimed in U.S. Pat. No. 4,997,232, which patent is incorporated herein by reference.

In one aspect of the invention, there is provided a shock absorbing bicycle seat mounting post assembly in which a plurality of layered cylindrical shims surround the mounting post, the shims having different diameters so as to form a stack of layered shims, each of the shims being removable to permit sizing of the seat post. With a number of remaining shims thereabout, the seat post easily adapts to the size of the opening in the tube of a bicycle frame.

As taught in the inventor's prior U.S. Pat. No. 4,997,232, a shaft to which the bicycle seat is attached slides up and down within a tubular member or sleeve against the bias of a compression spring operatively acting between the seat and the sleeve, the sleeve being clamped to the bicycle frame tube by appropriate means. At the lower end of the shaft is a threaded adjustment means for selectively setting the amount of the initial compression in the compression spring acting between the bicycle seat and the sleeve. In another improvement over the inventor's prior bicycle seat post, a flexible piston means is carried at the distal end of the shaft, the flexible piston means including an elastic washer sized to fit snugly into, and peripherally engage the inner surface of, the bicycle frame tube.

Preferably, the flexible piston means include a pair of hard stiff washers, such as metallic washers, with the elastic washer sandwiched therebetween. As the bicycle seat is thus moved down and up under the influence of the weight of the rider, the flexible piston means compresses and decompresses the air beneath it due to the air-tight fit between the flexible piston means and the inner surface of the bicycle frame tube.

In another aspect of the invention, the bicycle seat mounting post assembly is combined with an adjustable air chamber volume reducing means which is positioned below the bicycle seat mounting post assembly. The volume reducing means comprises at least one rubber-like disk-shaped stopper engageable with the inner surface of the frame tube in an air-tight relationship and is adjustably postionable in the tube frame for varying the volume of air between the piston on the threaded adjustment means of the seat post assembly and the disk-shaped stopper. Various forms of the volume reducing means are described and shown as exemplary embodiments.

As a safety feature, there is provided a flexible bellows around the compression spring to keep fingers and skin from being pinched.

Other improvements than those mentioned above will be evident when the various embodiments of the invention are described hereinafter.

As presented, the shock absorbing bicycle seat mounting post of this invention is simple in construction, easy to use, and economical in cost to manufacture.

To accomplish the above and related objects, the invention may be embodied in the form illustrated in the accompanying drawings, attention being called to the fact, however, that the drawings are illustrative only, and that changes may be made in the specific construction illustrated and described without departing from the scope of the invention as claimed in the appended claims.

DETAILED DESCRIPTION OF THE PREFERRED EMBODIMENTS

Figure 1:
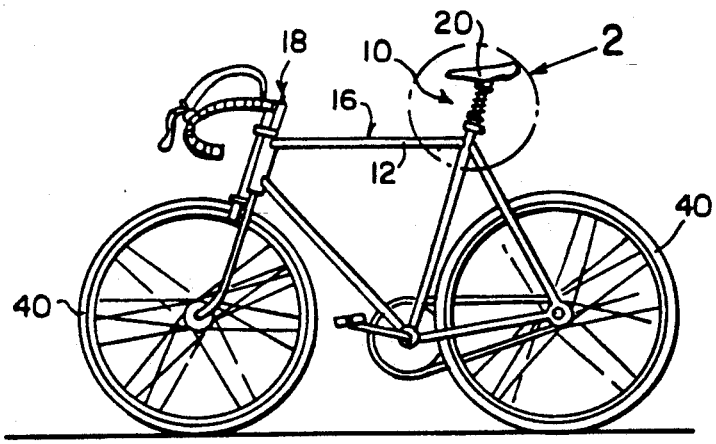
FIG. 1 is a side elevational view of a conventional bicycle equipped with a shock absorbing bicycle seat mounting post.

Turning now descriptively to the drawings, in which similar reference characters denote similar elements throughout the several views, FIGS. 1 through 4 illustrate a prior art shock absorbing bicycle seat mounting post in accordance with the inventor's prior U.S. Pat. No. 4,997,252. Shown in these figures is a seat mounting post 10 installed within a hollow tubular socket member 12 having a binder clamp 14 on a frame 16 of bicycle 18. The shock absorbing bicycle seat mounting post 10 contains a bicycle seat assembly 20, for supporting a person (not shown) riding the bicycle 18. A mounting structure 22 is attached to the bicycle seat assembly 20 and a first collar member 24 is affixed to lower end of the mounting structure 22.

An elongated shaft 26, having a cross section throughtout its length of three or more sides, is affixed at its upper end to the first collar member and extends downwardly therefrom. A threaded rod 28 is screwed axially into the distal end of shaft 26. A coil compression spring 30 is carried about the shaft 26 with its upper end bearing against the first collar member, while a second collar member 32 bears against the lower end of the spring 30.

A tubular member, or sleeve, 34, having an inner cross section throughout its length of three or more sides complementing the cross section of the shaft 26, is affixed at its upper end to the second collar member 32 and has a bore 35 shaped and sized to receive the shaft 26 therethrough. A lock washer 36 is carried on the rod 28 to bear against the bottom of the sleeve 34. A pair of nuts 38 are threaded onto the rod 28 to bear against the lower end of the sleeve 34 via lock washer 36. The sleeve 34 can be inserted into the hollow tubular member 12 and retained therein with the binder clamp 14 in a known manner. The shock absorbing bicycle seat mounting post 10 will effectively absorb shocks which are carried through the frame 16 when wheels 40 of the bicycle 18 encounter obstacles and holes when traveling along the ground.

Figure 4:
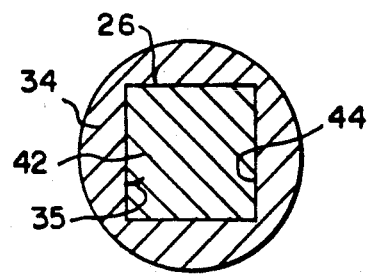
FIG. 4 (prior art) is a cross sectional view taken along line 4—4 in FIG. 3, showing a square shaped shaft and corresponding sleeve.

As shown in FIG. 4, the shaft 26 may be square-shaped in cross section and the bore 35 in the sleeve 34 may also be square-shaped in cross section so that the shaft 26 will not rotate within the sleeve 34, but will still be able to slide up and down. Other cross sectional shapes, such as hexagonal, may be preferred.

The improvements over the inventor's prior invention are illustrated in FIGS. 5–14. The improvements include elements of safety and comfort as well as elements which permit the bicycle seat mounting post to be adapted to various sizes of bicycle frames.

As alluded to earlier, one of the problems in producing bicycle seat posts is that the manufacturer must produce a number of different sizes of posts in order to fit the different diameter bicycle frame tubes 12. At the present time, there are several common sizes of bicycle frame tubes, and in the past, manufacturers have had to either produce a number of different sizes of bicycle seat posts or restrict their production to the more common sized bicycle frame tube or tubes. To alleviate this problem of the prior art, a plurality of cylindrical shims 60 are provided, each having a flared top 62 directed radially outwardly to act as a stop against top edge 13 of the bicycle frame tube 12. A vertical slit 64 is provided in each cylindrical shim to permit easy insertion and removal of the shim around the sleeve 34. It is intended that the bicycle seat post assembly according to the present invention would be shipped to the consumer with a number, e.g. six, shims already mounted on the sleeve 34. The user would then remove as many shims as is necessary to arrive at an appropriate diameter to fit the particular bicycle frame tube diameter in which the seat post assembly is to be inserted. Six shims would result in the ability to fit seven different frame sizes. It is to be understood, however, that there is no intention by this description to limit the size or number of shims employed. The cylindrical shims 60 could be made of a hard plastic or metal but must be paper thin in order to be able to accommodate all of the incremental sizes of available bicycle frame tubes. Regardless of the material used, the inner and outer cylindrical surfaces of the shim 60 should offer some significant frictional drag so as not to permit the seat post from easily turning within the bicycle frame tube after mounting is completed.

Figure 2:
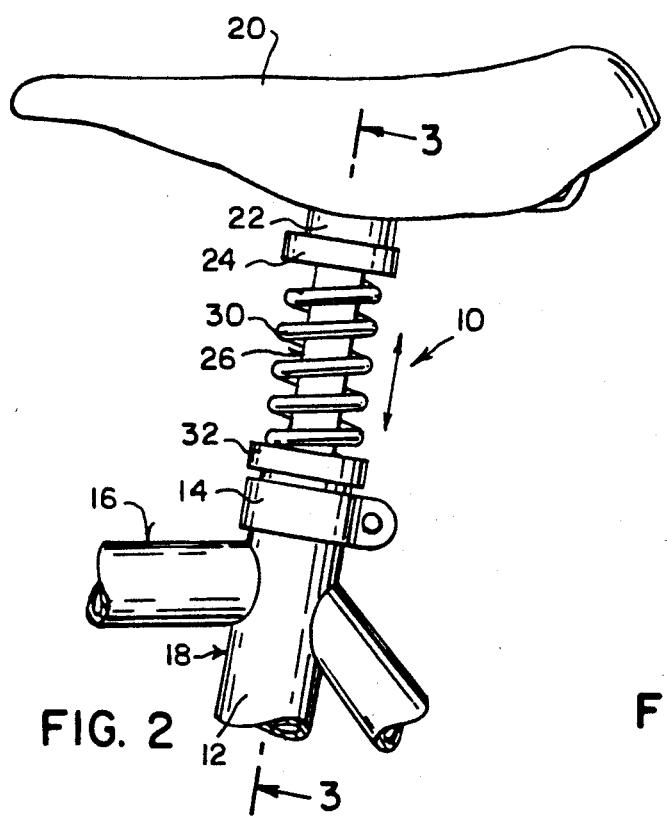
FIG. 2 is an enlarged side elevational view of a prior art shock absorbing bicycle seat mounting post installed on the bicycle frame as indicated by arrow 2 in FIG. 1.

In addition to the compression spring 30 shown and described with reference to FIGS. 2 and 3, in order to reduce the stringent requirements on a single spring 30 and/or to increase the suspension supportability of the spring 30, a second spring 66 is provided. Spring 66 has a smaller diameter than spring 30 and fits within the center opening of spring 30 in concentric fashion. Of course, any number of springs could be used, and the selection of the number and strengths of each spring would depend on the intended use of the invention. For example, a unique combination of spirngs could be selected dependent upon the weight class of the intended user. Spring 66 is shown to be wound in the opposite direction to that of spring 30 but can be wound in either direction.

Figure 5:
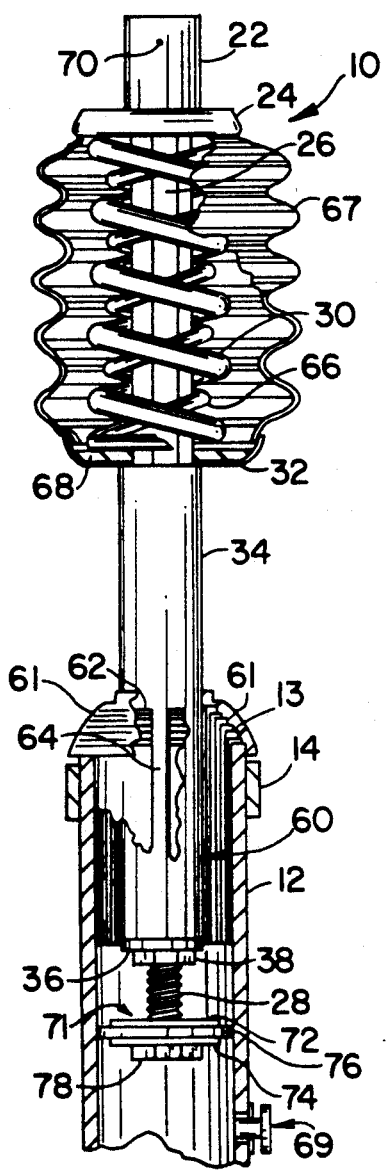
FIG. 5 is a partial cross sectional view of an improved bicycle seat mounting post assembly in accordance with the present invention.
Figures 13, 14:
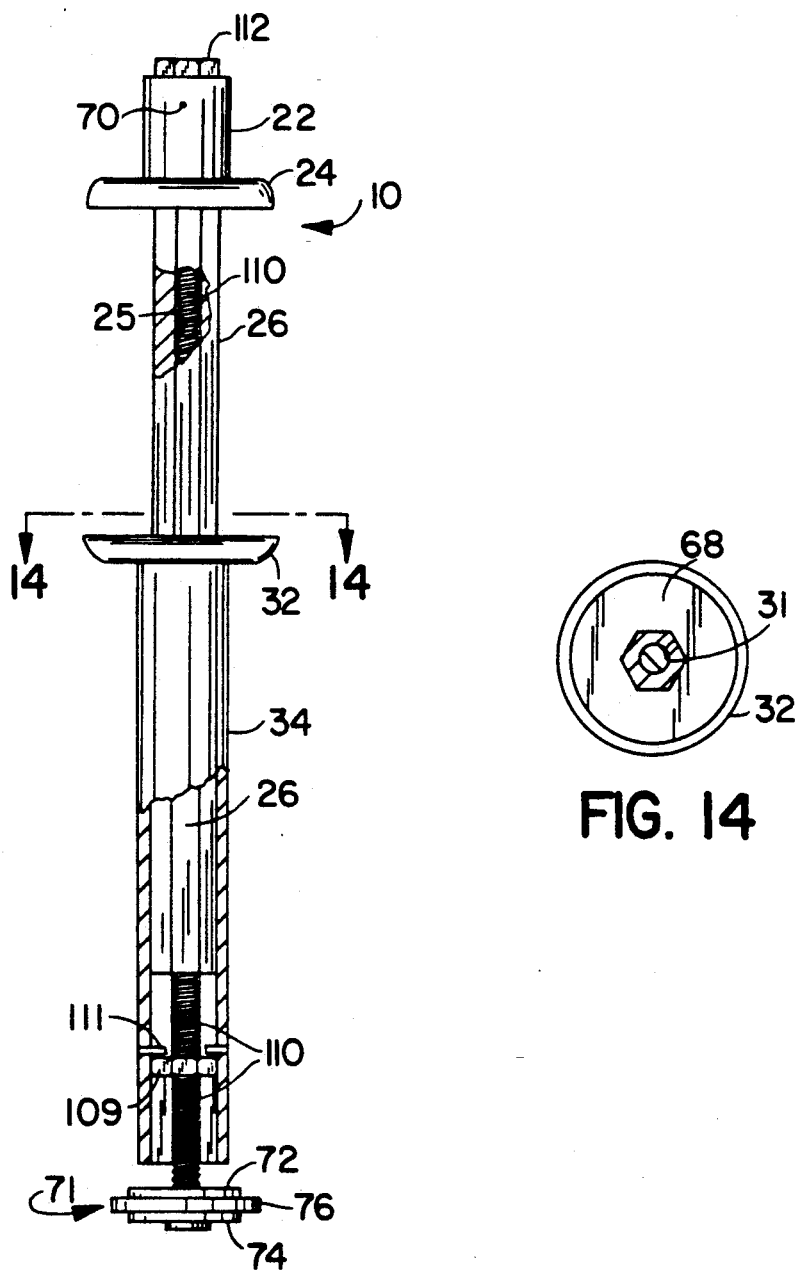
FIG. 13 illustrates a modified seat post assembly with the springs removed, showing an alternative tension adjustment device.
FIG. 14 is a cross sectional view taken along the lines 14—14 in FIG. 13.

Shown in FIG. 5, and in FIG. 14, the shaft 26 is hexagonal in shape, meaning that the internal bore 35 (FIG. 3) is likewise hexagonal in cross sectional shape on the interior thereof. This geometry permits a high degree stability in the telescoping function between shaft 26 and sleeve 34. In order to further improve the smoothness of slidability between these two members, an optional insert 68 of plastic or synthetic fluorine-containing resin (e.g. Teflon) is provided. The insert 68, again as best seen in FIG. 14 has a hexagonal opening 31 therein to closely fit with the hexagonal exterior surface of shaft 26, thereby minimizing sliding resistance between the collar 34 and the shaft 26. Insert 68 is held in place by the compressive forces of the coil springs 30 and 66 which are always in a compression state. Collar 32 is cupped at its periphery to receive insert 68 as shown in FIG. 5.

In FIG. 5, shaft 26 projects upwardly through collar 24 with its hexagonal configuration, and a short tubular piece with a hexagonal inner surface, mating with the hexagonal configuration of shaft 26, thereby defines the seat mounting structure 22. Collars 24 and 32 can be welded to the structure 22 and sleeve 34, respectively, or they may be assembled without fixation, to be held in place by the compressive forces of the springs 30, 66. A pin 70 holds the seat mounting structure 22 against axial movement, while the hexagonal fit prevents rotation of the structure 22 relative to shaft 26. Pin 70 is, preferably, short enough not to penetrate completely through the structure 22 for reasons to be discussed later.

Figure 3:
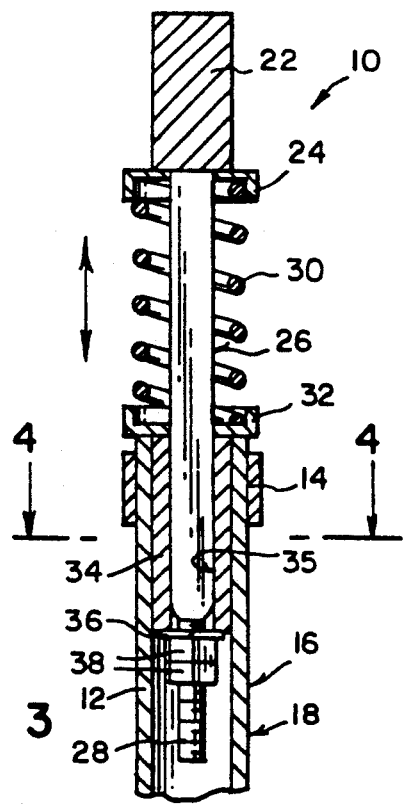
FIG. 3. (prior art) is a cross sectional view taken along line 3—3 in FIG. 2, showing the internal structure thereof.

Rather than leaving the threaded rod 28 exposed as shown in FIG. 3, a significant benefit can be derived by adding a small subassembly 71 (flexible piston means) at the end thereof comprising a pair of metal washers 72, 74 with a rubber washer 76 sandwiched therebetween and held from removal from the end of threaded rod 28 by means of a nut or other securing means 78. In manufacture, the complete subassembly 71 can be made as a unitary production item permanently or temporarily mounted or mountable to the lower end of threaded rod 28. A lower cost alternative would include a pair of nuts (not shown) tightened against one another with the metal washers 72, 74 and rubber washer 76 captured therebetween. It will also be evident to the skilled worker that a cupped leather washer could replace rubber washer 76, similar to the construction of a hand bicycle pump piston.

The benefits of providing a washer 76 are manifold. First, for heavier weight riders, the shaft 26 moves downwardly causing the end of threaded rod 28 to extend some distance into the frame tube 12. The rubber washer 76 is sized to snugly fit within frame tube 12 and thus offers additional lateral stability to the bicycle seat post assembly.

More importantly, by the close fit between the outer diameter of washer 76 and frame tube 12, a column of air Will be compressed beneath washer 76 when a rider encounters a bump and the seat experiences a downwardly directed impactive force. If the bicycle frame tube is closed (air-tight), then the compression of the air beneath washer 76 cushions the impactive forces applied to the seat in addition to the spring reactive forces due to coils 30, 66. The washer 76 can be made of any flexible or elastic material such as rubber or leather. For bicycle frames that are not air-tight, an arrangement yet to be described will provide a closed air chamber, and this feature of the invention will be described later in connection with FIGS. 6, 11, and 12.

As a safety measure, a flexible plastic or rubber bellows 67 is fitted around coil springs 30, 66. The upper and lower ends of bellows 67 are designed to fit within the flanged peripheries of collars 24 and 32, respectively as shown in FIG. 5. The bellows acts as a finger and skin guard, especially useful when a second passenger is riding behind the main bicycle rider where the likelihood of a finger or the skin of a leg could be pinched by the collapsing coils 30, 66. In addition to the safety feature just described, bellows 67 keeps dust and dirt and other containments out of the operating mechanism comprising the shaft 26, sleeve 34, and springs 30, 66. The thickness of the material for bellows 67 must, naturally, be thick and strong enough to keep a child's small fingers out of the area between the coil windings, and yet not be too stiff to interfere with the compression of coils 30, 66. In this connection, the reverse direction of winding of coils 30 and 36 helps to prevent accidental pinching of fingers by the fact that the inner coil provides some degree of protection against a small finger being completely inserted between the coils of the larger diameter spring 30, in addition to the protection offered by bellows 67.

Collar 32 may be welded or otherwise affixed to the top of sleeve 34, or it may simply be forced against the top of sleeve 34 by the axially directed force of the compression springs 30, 66. In either case, the insert 68 eliminates resistance between the collar 32 and shaft 26 as the shaft 26 moves up and down within sleeve 34. Advantageously, if the collar 32 is fixed to sleeve 34, as by welding, and if the internal diameter of the cupped collar 32, from wall to wall, is equal to the outer diameter of the insert 68, the insert forces shaft 26 to be centrally located with respect to the bore in sleeve 34, minimiing frictional drag between shaft 26 and sleeve 34.

A simple arrangement for fixing the mounting structure 22 to the top of shaft 26 is by means of a hard metal pin 70. Because of the possibility of using an alternative adjustment mechanism as will be described in connection with FIG. 13, it is important that pin 70 does not penetrate completely through shaft 26. On the other hand, if the embodiment of FIG. 13 is not used, there is no reason to limit the depth of penetration of pin 70 into structure 22 and shaft 26.

For additional impact absorption, a piston subassembly 71 is provided at the lower end of threaded rod 28. The action of springs 30, 66 tend to push up on collar 24 which, in turn, pushes up against mounting structure 22 lifting shaft 26 until washer 36 abuts the lower end of sleeve 34. This means that the lower end of threaded rod 28 moves up and down within the bicycle frame tube 12. With the piston subassembly 71 attached to the end of threaded rod 28, a compression of the air beneath the piston 71 will absorb high impact forces applied to the seat, as when a rider hits an abrupt bump or pothole in the road.

The piston subassembly 71 comprises a pair of metal washers 72, 74 with a rubber, leather, or other flexible washer 76 sandwiched therebetween. The washers 72, 74 may be threaded and a nut 78 will serve to secure the piston 71 arrangement to the bottom of threaded rod 28. Threaded rod 28 could also be the threaded portion of a bolt whose head 78 is permanently attached. A yet further alternative would comprise a threaded rod 28 with a factory supplied unitary piston 71 arrangement of washers 72, 74, 76 already in proper position. In any case, because of the different sizes available for bicycle frame mounting tubes 20, either an assortment of washer 76 or an assortment of different sizes of unitary piston subassemblies 71 will be provided with each seat post assembly, with the varying sizes of piston 71 corresponding to the sizes of the shims 60 described earlier.

Figure 6:
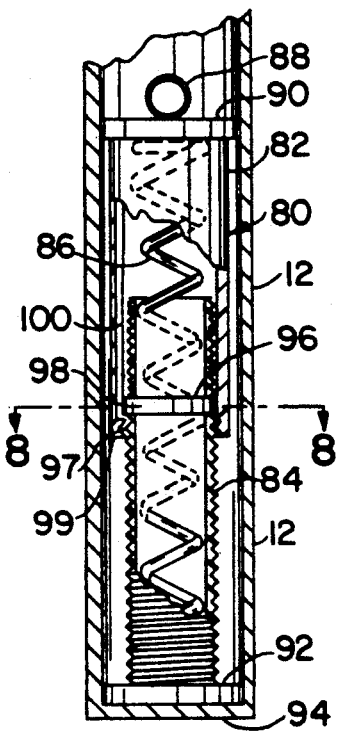
FIG. 6 shows an embodiment of an adjustable air chamber volume reducing means.

In order for the piston subassembly 71 to operate effectively, there must be trapped air beneath the bicycle seat post 10. Referring to FIG. 6, since the frame tube 12 in which the post mounts may not be sealed, or it may not have the proper amount of air volume contained within it, the present invention provides a means to create an air chamber and to appropriately adjust for the amount of air volume beneath the post assembly to provide optimal operating characteristics. Toward that end, an adjustable air chamber volume reducing means 80 is provided. In its simplest form, a lightweight plastic or foam cylinder 108 (FIG. 12) can be inserted into the frame tube 12. If the bottom 94 of the frame tube 12 is not closed, a pair of washers 90, 92 on each end of cylinder 108 will provide an air-tight fit with the inner surface of frame tube 12. For easy removal of the volume reducing means 80, a small ring 88 is mounted to the top washer 90, or, if a washer 90 is not used, attached to the cylinder 108 by other means for example, by gluing.

Figure 12:
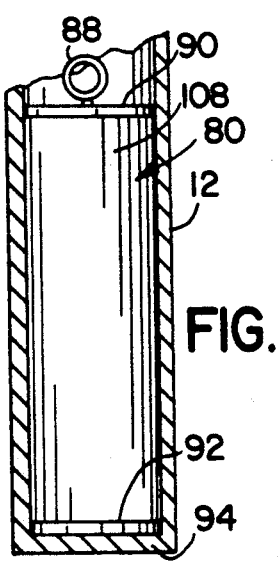
FIG. 12 shows a third embodiment of an air column volume reducing means positioned below the bicycle seat post assembly mounted in a bicycle frame tube.

Returning to FIG. 6, a pair of washers 90, 92 and a removal ring 88 are members in common with the embodiment described in connection with FIG. 12. The volume reducing means 80 of FIG. 6, however, is adjustable in length to thereby adjust the amount of air volume between the top of the volume reducing means 80 and the bottom of the piston 71. In the simplest form of the embodiment of FIG. 6, an upper cylindrical tube is provided with internal threads 97 which mate with the outer threaded surface of the bottom cylindrical telescoping tube 84. In this basic form, the user can merely remove the unit from the frame tube by hooking ring 88 with a hooked tool and twisting the two cylindrical members 82, 84 to shorten or lengthen the spacing between washers 90 and 92. The unit is then reinserted back into frame tube 12.

The ring 88 serves another purpose other than as a convenience for removing the volume varying means 80. When in position, a slotted tool can be inserted into frame tube 12 and receive ring 88 in the tool slot provided. The tool can then be rotated clockwise or counter clockwise to move the threaded cooperating members 97, 84 or 96, 84 to collapse or expand the volume reducing means without having to remove it from the bicycle frame. This means, of course, that the bottom washer 92 must have significant pressure against the inner surface of frame tube 12 to remain in place while the top cylindrical part 82 is being rotated for adjustment.

When the impactive force is transmitted to piston 71 to compress the air above washer 90, it may be desirable to have the air volume reducing means 80 also compress to further absorb the shock. In such a case, instead of the threaded cooperation between threads 97 and 84, a slidable internally threaded ring 96 is provided with a tab 98 fitting into an elongated slot 100 in the side of the upper cylindrical part 82. In this manner, the two cylindrical tubes 82, 84 can slide freely within one another in the direction to collapse the two parts together, and in the opposite direction until threaded ring 96 is stopped against protruding portions 99 of the upper cylindrical part 82. A compression spring 86 is provided within the hollow openings of the two cylindrical parts 82, 84 to force them apart until threaded ring 96 abuts protrusions 99. When an impactive force is applied to abruptly cause piston 71 to compress the air beneath it, the increased pressure against washer 90 cause it to move downwardly, permitting threaded ring 96 to rise in cylindrical part 82 temporary until the impact is passed, at which time the compression spring 86 will return the volume reducing means 82 to its fully extended condition.

Figure 7:
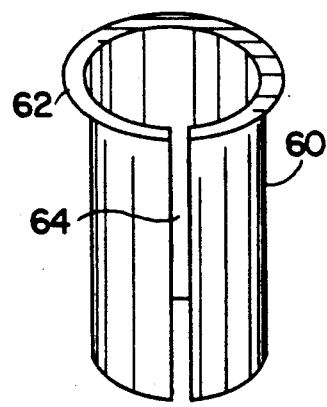
FIG. 7 is a perspective view of one of the shims for sizing the seat post.

FIG. 7 shows a single shim 60 with its flanged upper rim 62 and vertical slit 64 as herein before described.

Figure 8:
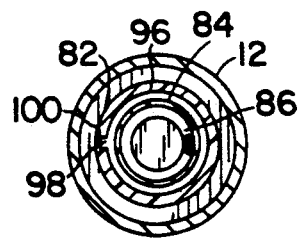
FIG. 8 is a sectional view taken along the lines 8—8 in FIG. 6.

FIG. 8 is a cross sectional view taken along the lines 8—8 in FIG. 6 better illustrating the cooperation between the tab 98 on the threaded ring 96 and the vertical slot 100 in the upper cylindrical part 82.

Figure 9:
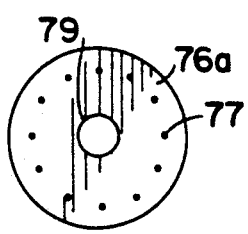
FIG. 9 illustrates one embodiment of a piston washer in accordance with the present invention.

FIG. 9 shows one embodiment of the piston washer 76a having a central opening 79 to accommodate threaded rod 28, and a series of small holes 77 provided to regulate the amount of air passage through the washer 76a upon receiving an impactive force on the seat. Without the small apertures 77, the air compression could be too stiff to be comfortable for the rider. The total area of the number of apertures 77 is calculated to provide optimum comfort in this regard. In addition to washer 76, or alternative thereto, air flow control may be enhanced by the provision of a petcock valve 69 (FIG. 5) constituting an air flow control valve to regulate the amount of air escaping from the air chamber beneath washer 76 upon impact. Such item may be easily installed in the frame tube by drilling and threading the petcock valve 69 into the drilled and threaded hole. Such valves are available from various sources and provide the user with regulated air flow adjustment to attain the desired impact reaction.

Figure 10:
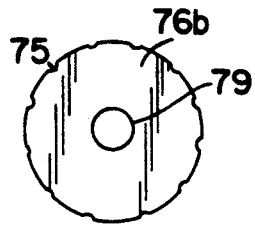
FIG. 10 illustrates a second embodiment of the piston washer.

FIG. 10 is an alternative embodiment of the piston washer 76b showing a central opening 79 and notches 75 on its periphery, the latter serving the same purpose as the small apertures 77 in the embodiment of FIG. 9.

Figure 11:
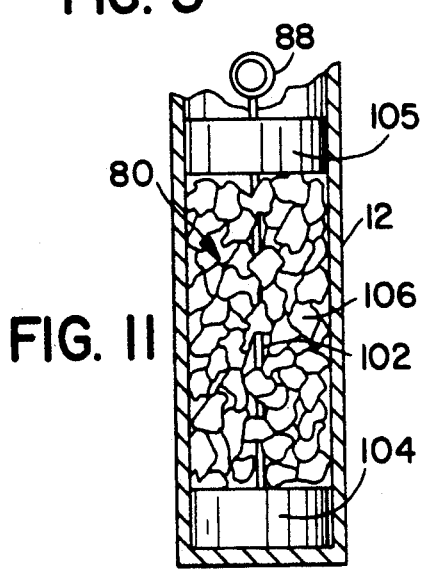
FIG. 11 shows a second embodiment of an air column volume reducing means positioned below the bicycle seat post assembly mounted in a bicycle frame tube.

FIG. 11 is yet another embodiment of the volume reducing means described in connection with FIGS. 6 and 12. In the embodiment of FIG. 11, rubber washers 104, 105 are seated at the bottom and top of the frame tube 12, and a number of foam particles 106 are poured into frame tube 12 between washers 104 and 105 to fill the frame tube to the desired volume beneath the piston 71. FIG. 11 shows a wire 102 connecting the removal ring 88 through flexible washer 105 to the flexible washer 104. Washers 104 and 105 are shown to be rather thick so as not to deform and allow the particles 106 to contaminate the rest of the bicycle frame and to, of course, not lose the desired volume taken up by the foam particles poured into the tube in the first instance.

In the embodiment of FIG. 13, the shaft 26 has a bore 25 completely therethrough. The threaded rod described in connection with FIGS. 3 and 5 is thus in the form of a long bolt 110 extending the full length of the post assembly 10, and beyond. A head 112 on the bolt 110 is accessible at the top of the seat mounting structure 22 for adjustment purposes. A portion of the bolt 110 extends downwardly beyond the end of the shaft 26 and sleeve 34 to a distal end, and the piston arrangement 71 is mounted on the lower end of bolt 110. In this embodiment, the nut 109 is preferably hexagonal shaped and fits slidably within the sleeve 34 having a hexagonal inner surface of the same shape and size. Thus, rotation of the head 112 of bolt 110 will adjust the compression of the coil springs between collars 24, 32 due to the pressure of head 112 acting on the top of structure 22 and the bolt 109 acting on a pair of pins 111 which act as vertical stops for the bolt 109. Other means than pins 111 can be provided to stop nut 109 from rising higher than a predetermined amount so as to adjust and maintain the initial compressive forces of the springs 30, 66 (not shown in FIG. 13). The bolt 109 is, however, free to move downwardly upon encountering impactive forces applied to the bicycle seat.

FIG. 14 shows a view of the insert 68 with its hexagonal opening 31, insert 68 being held secured within the cupped lower collar 32.

The seat mounting structure 22 has been shown herein as a cylindrically shaped stud. Such a mounting structure is in common use in the field and will accommodate most consumer-purchased seats. It is to be understood, however, that a seat mounting structure of any design could be fixed to the top of shaft 26, including modern multi-directionally adjustable models (not shown).

To keep moisture and other contaminants out of the region of the shims 60, a wide rubber band 61, or similar stretchable annular cap, may be stretched around the stack of shims 60 and create a seal between the sleeve 34 and frame tube 12. This item (61) may be shipped with the seat post assembly.

While certain novel features of this invention have been shown and described and are pointed out in the appended claims, the invention is not intended to be limited to the details above, since it will be understood that various omissions, modifications, substitutions and changes in the forms and details of the device illustrated, and in its operation, can be made by those skilled in the art without departing in any way from the spirit of the present invention.

I claim:

1. A shock absorbing bicycle seat mounting post assembly for placement within a tube of a bicycle frame and for supporting a bicycle seat thereon, said mounting post assembly comprising:

an elongated shaft having an upper portion and lower portion;

a bicycle seat mounting structure fixed on said upper portion of said shaft upon which a bicycle seat can be mounted;

a tubular member slidably received about said shaft and along a length of said lower portion of said shaft;

means preventing rotation between said shaft and said tubular member;

a plurality of layered cylindrical shims surrounding said tubular member, said shims having different diameters so as to form a stack of layered shims, each of said shims being removable to permit the sizing of said tubular member, with any remaining shims thereabout, to match the size of the opening in the tube of a bicycle frame;

resilient means between said seat mounting structure and said tubular member for resiliently urging said tubular member away from said seat mounting means; and a threaded adjustment means for adjustably positioning said tubular member relative to said lower portion of said shaft and against the urging force of said resilient means to establish a predetermined initial supporting force against which the weight of a person sitting on the bicycle seat counteracts.

2. The bicycle seat mounting post assembly as claimed in claim 1, wherein a portion of said threaded adjustment means extends downwardly beyond the end of said shaft and said tubular member to a distal end, and the bicycle frame tube is air filled and air tight below said distal end, said threaded adjustment means comprising a flexible piston means carried at said distal end, said flexible piston means including an elastic washer sized to fit snugly into and peripherally engage the inner surface of the bicycle frame tube, whereby trapped air below said piston means is compressed upon movement of said elongated shaft under the influence of a rider's weight being applied to the bicycle seat.

3. The bicycle seat mounting post assembly as claimed in claim 2, wherein said flexible piston means comprises a pair of rigid washers having diameter smaller than the diameter of said elastic washer and disposed coaxially with said elastic washer, with said elastic washer sandwiched therebetween.

4. The bicycle seat mounting post assembly as claimed in claim 1, wherein:

each of said cylindrical shims is slotted in the axial direction for easy removal from said tubular member;

each of said cylindrical shims is flared radially outwardly at one end thereof to at as a stop against an adjacent shim or against the top edge of the tube of a bicycle frame; and said mounting post assembly includes an elastic sealing member covering said flared ends and sealing the region between said tubular member and said frame tube.

5. The bicycle seat mounting post assembly as claimed in claim 1, wherein said resilient means comprises a coil compression spring coaxial with said shaft.

6. The bicycle seat mounting post assembly as claimed in claim 5, wherein said spring is coiled in a first circumferential direction, and said resilient means further comprises an additional coil compression spring would in the circumferential direction opposite said first circumferential direction, each spring being of a different diameter such that said springs are disposed coaxially.

7. The bicycle seat mounting post assembly as claimed in claim 1, wherein:

said seat mounting structure comprises an outwardly directed first collar;

said tubular member comprises an outwardly directed second collar; and said resilient means comprises a coil spring means coupled between said first and second collars.

8. The bicycle seat mounting post assembly as claimed in claim 7, wherein said post assembly further comprises an insert of plastic or synthetic fluorine-containing resin fitted about said shaft and axially captured between said coil spring and said second collar, said insert having a central opening therein substantially the same shape and size as the outer edge of a cross section of said shaft, thereby minimizing sliding resistance between said second collar and said shaft.

9. The bicycle seat mounting post assembly as claimed in claim 7, comprising a flexible bellows surrounding said coil spring and extending between said first and second collars, said bellows being formed of a material which is light and flexible enough to not interfere with the functioning of said resilient means, while heavy and inflexible enough to act as a skin or finger guard.

10. The bicycle seat mounting post assembly as claimed in claim 9, wherein said collars and said bellows have mating surfaces which contact in a close fit to prevent dust and dirt particles from entering internally of said bellows.

11. The bicycle seat mounting post assembly as claimed in claim 2, wherein said flexible piston is provided with a plurality of small holes to permit a regulated amount of air to pass therethrough when said piston moves within the tube of a bicycle frame.

12. The bicycle seat mounting post assembly as claimed in claim 2, wherein said flexible piston is provided with a plurality of small notches about its periphery to permit a regulated amount of air to pass therethrough when said piston moves within the tube of a bicycle frame.

13. The bicycle seat mounting post assembly as claimed in claim 2, wherein said flexible washer is removable and replaceable with a similar washer of a different diameter in order to fit snugly within a variety of sizes of frame tubes.

14. A shock absorbing bicycle seat mounting post assembly for placement within a tube of a bicycle frame and for supporting a bicycle seat thereon, said mounting post assembly comprising:
   an elongated shaft having an upper portion and lower portion;
   a bicycle seat mounting structure fixed on said upper portion of said shaft upon which a bicycle seat can be mounted;
   a tubular member slidably received about said shaft and along a length of said lower portion of said shaft;
   means preventing rotation between said shaft and said tubular member; and
   a plurality of layered cylindrical shims surrounding said tubular member, said shims having different diameters so as to form a stack of layered shims, each of said shims being removable to permit the sizing of said tubular member, with any remaining shims thereabout, to match the size of the opening in the tube of a bicycle frame.

* * * * *